US00RE44588E

(19) United States
(12) Reissued Patent
Chung et al.

(10) Patent Number: US RE44,588 E
(45) Date of Reissued Patent: Nov. 12, 2013

(54) ANTENNA ASSEMBLY AND PORTABLE TERMINAL HAVING THE SAME

(75) Inventors: Kyung-Ho Chung, Seoul (KR); Jung-Ho Yoon, Seoul (KR)

(73) Assignee: LG Electronics Inc., Seoul (KR)

(21) Appl. No.: 13/278,440

(22) Filed: Oct. 21, 2011
(Under 37 CFR 1.47)

Related U.S. Patent Documents

Reissue of:
(64) Patent No.: 7,609,221
Issued: Oct. 27, 2009
Appl. No.: 11/855,716
Filed: Sep. 14, 2007

(30) Foreign Application Priority Data

Sep. 27, 2006 (KR) ..... 10-2006-0094121

(51) Int. Cl.
*H01Q 1/52* (2006.01)

(52) U.S. Cl.
USPC ..... 343/841; 343/700 MS; 343/702

(58) Field of Classification Search
USPC ..... 343/700 MS, 702, 841, 846
See application file for complete search history.

(56) References Cited

U.S. PATENT DOCUMENTS

| | | | | |
|---|---|---|---|---|
| 6,239,753 | B1 | 5/2001 | Kado et al. | |
| 6,295,030 | B1 | 9/2001 | Kozakai et al. | |
| 6,867,746 | B2 * | 3/2005 | Mendolia et al. | 343/841 |
| 7,209,087 | B2 | 4/2007 | Tang et al. | |
| 7,471,249 | B2 * | 12/2008 | Tang et al. | 343/702 |
| 7,511,668 | B2 * | 3/2009 | Hirabayashi | 343/700 MS |
| 2003/0193437 | A1 | 10/2003 | Kangasvieri et al. | |
| 2004/0051669 | A1 | 3/2004 | Rutfors et al. | |
| 2005/0200535 | A1 | 9/2005 | Elkobi et al. | |
| 2006/0208949 | A1 | 9/2006 | Hirabayashi | |
| 2007/0210968 | A1 | 9/2007 | Chung et al. | |

FOREIGN PATENT DOCUMENTS

| | | | |
|---|---|---|---|
| DE | 197 13 929 | A1 | 11/1997 |
| DE | 19713929 | A1 | 11/1997 |
| DE | 694 14 853 | T2 | 4/1999 |
| DK | 19713929 | A1 | 11/1997 |
| EP | 0 720 252 | A1 | 7/1996 |
| KR | 1995-0013610 | B1 | 11/1995 |
| KR | 10-2001-0040027 | A | 5/2001 |
| WO | WO 95/02284 | A1 | 1/1995 |
| WO | WO 03/103361 | A1 | 12/2003 |

* cited by examiner

*Primary Examiner* — Hoang V Nguyen
(74) *Attorney, Agent, or Firm* — Birch, Stewart, Kolasch & Birch, LLP

(57) ABSTRACT

An antenna assembly, and a portable terminal having the same. The antenna assembly according to an embodiment comprises: a circuit board having a ground plane at a predetermined region; first and second antenna conductors spaced from each other at one side of the ground plane; and a shielding wall disposed between the ground plane and the antenna conductors, for reducing a coupling between the first and second antenna conductors. Since a plurality of antennas are mounted at a small space inside the portable terminal with maintaining their functions, an isolation characteristic between the antennas is enhanced, and a mutual coupling between the antennas is minimized.

42 Claims, 7 Drawing Sheets

ANTENNA ASSEMBLY AND PORTABLE TERMINAL HAVING THE SAME

Matter enclosed in heavy brackets [ ] appears in the original patent but forms no part of this reissue specification; matter printed in italics indicates the additions made by reissue.

RELATED APPLICATION

*This is a reissue application of Ser. No. 11/855,716 (now U.S. Pat. No. 7,609,221), which is incorporated by reference in its entirety.*

The present disclosure relates to subject matter contained in priority Korean Application No. 10-2006-0094121, filed on Sep. 27, 2006, which is herein expressly incorporated by reference in its entirety.

BACKGROUND OF THE INVENTION

1. Field of the Invention

The present disclosure relates to an antenna assembly having an enhanced isolation characteristic, and a portable terminal having the same.

2. Description of the Background Art

A portable terminal is a kind of portable electronic device having at least one of an audio call function, a video call function, an information input/output function, a data storage function, etc.

As the portable terminal has various functions, the portable terminal is provided with complex functions such as a function for capturing a photo or a moving image, a function for reproducing a music file or a moving image file, and a function for receiving broadcasting data.

More efforts are being performed in a hardware or software aspect so as to implement the various functions of the portable terminal. A user's interface for allowing a user to easily and conveniently search or select a function is being provided.

As information communication technique develops, an amount of data that can be wirelessly transceived is increased, and a transmission speed of data becomes fast. Accordingly, an antenna for wirelessly receiving a large amount of data with high quality even while a user moves is required.

In designing an antenna for wirelessly transmitting data with high speed, a so-called "cancel-out" due to an interference between signals received through different paths occurs. Accordingly, required is an antenna that matches with an appearance of the portable terminal and is suitable for the portable terminal having components integrated with each other with high density.

SUMMARY OF THE INVENTION

Therefore, an object of the present disclosure is to provide an antenna assembly capable of implementing a diversity by arranging a plurality of antennas at a small space inside a portable terminal.

Another object of the present disclosure is to provide an antenna assembly capable of minimizing a lowering of an isolation characteristic between a plurality of antennas.

To achieve these and other advantages and in accordance with the purpose of the present disclosure, as embodied and broadly described herein, there is provided an antenna assembly, comprising: a circuit board having a ground plane at a predetermined region; a first antenna conductor and a second antenna conductor spaced from each other at one side of the ground plane; and a shielding wall disposed between the ground plane and the antenna conductors, for reducing a coupling between the first and second antenna conductors.

To achieve these and other advantages and in accordance with the purpose of the present disclosure, as embodied and broadly described herein, there is also provided a portable terminal having the antenna assembly.

According to the present invention, since a plurality of antennas are mounted at a small space inside a portable terminal with maintaining their functions, an isolation characteristic between the antennas is enhanced, and a mutual coupling between the antennas is minimized.

When a cellular phone, a PDA (Personal Digital Assistants), a notebook computer, a PMP (Personal Multimedia Player), and various kinds of portable terminals are to adopt a built-in multiple antenna for implementing 3.5 G and 4 G mobile communication service, the antenna assembly can be effectively used. Also, the antenna assembly can be applicable to various built-in MIMO/Diversity antennas.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present disclosure, examples of which are illustrated in the accompanying drawings.

Hereinafter, an antenna assembly and a portable terminal having the same according to the present invention will be explained in more detail with reference to the attached drawings.

Figure 1:
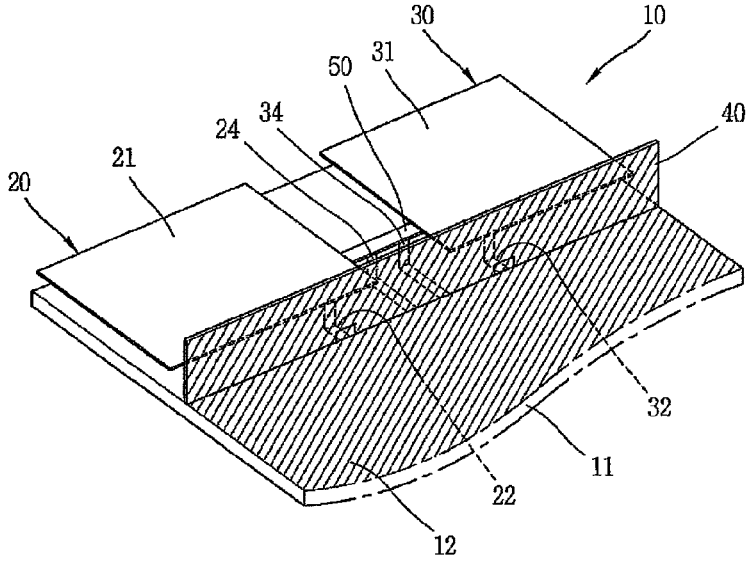
FIG. 1 is a perspective view showing an antenna assembly according to a first embodiment of the present invention.

FIG. 1 is a perspective view showing an antenna assembly according to a first embodiment of the present invention.

Referring to FIG. 1, an antenna assembly 10 includes first and second antennas 20 and 30 for diversity.

The first and second antennas 20 and 30 are connected to a circuit board 11 having a ground plane 12 at a predetermined region, thereby implementing a wireless communication characteristic.

The first and second antennas 20 and 30 may be integrally arranged at one side of the circuit board 11 so as to be disposed at a limited space of a small and slim device such as a cellular phone, a PDA, and a notebook.

The first antenna 20 has a first antenna conductor 21 for transceiving (transmitting and receiving) a wireless signal. The second antenna 30 also has a second antenna conductor 31 having a length or a pattern for transceiving a signal in the same operation bandwidth as the first antenna 20. The second antenna conductor 31 is spaced from the first antenna conductor 21.

In a state that the number of antennas of the antenna assembly 10 is increased, when data is transmitted from a base station through a plurality of paths, signals received at a receiving end of the portable terminal through the paths are detected thus to decrease an interference between the signals. Accordingly, a MIMO (Multi-input Multi-Output) antenna can be easily implemented.

The first and second antennas 20 and 30 have feeding portions 22 and 32 for feeding a signal to the circuit board 11, respectively. The feeding portions 22 and 32 may be disposed at positions where resonance frequencies of the first and second antennas 20 and 30 are determined.

Figure 2:
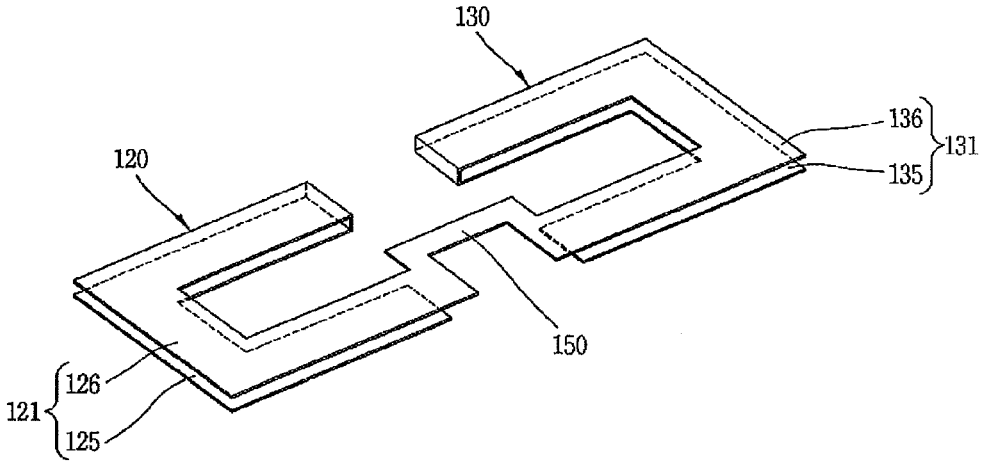
FIG. 2 is a perspective view showing an antenna conductor of an antenna assembly according to a second embodiment of the present invention.
Figure 3:
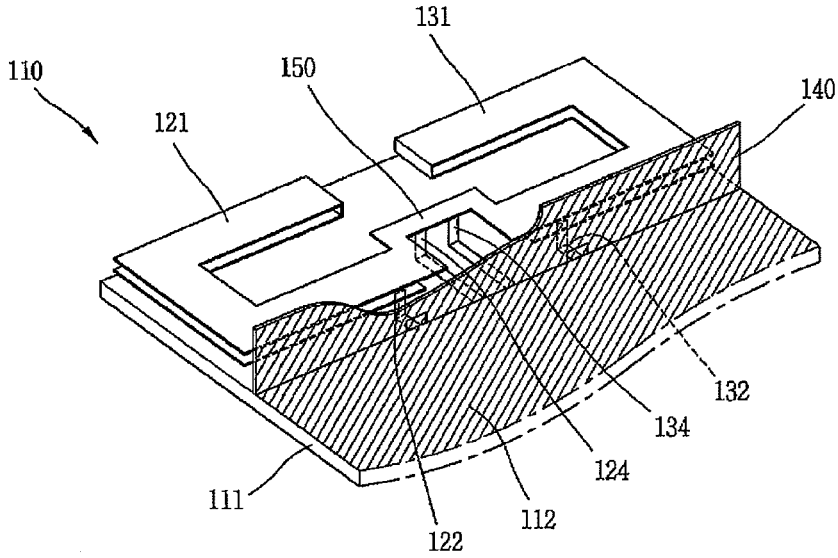
FIG. 3 is a perspective view showing an antenna assembly having the antenna conductor of FIG. 2 therein.
Figure 4:
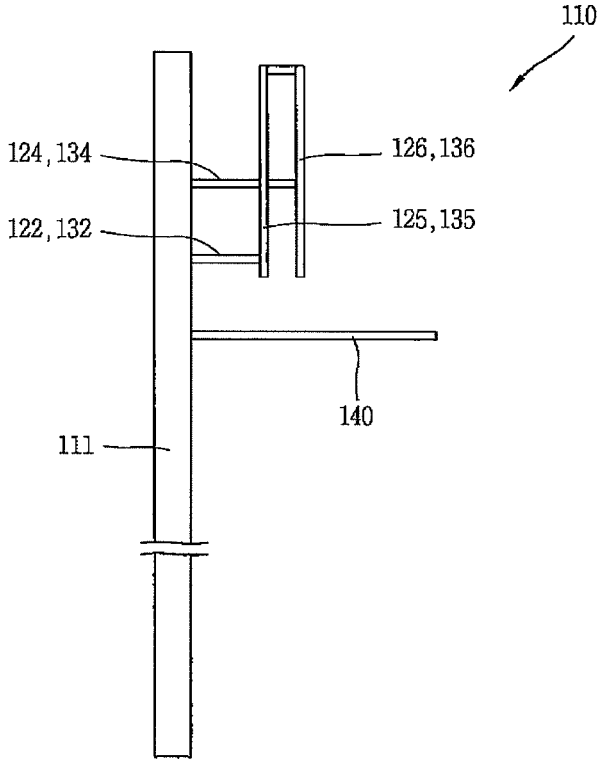
FIG. 4 is a side view showing the antenna assembly of FIG. 3.

The first and second antenna conductors 21 and 31 may be formed to have various patterns according to an operation bandwidth. FIGS. 2 to 4 respectively show an antenna having a folded portion.

Referring to FIG. 1, the first and second antenna conductors 21 and 31 are electrically connected to each other by a connecting portion 50. Ground connecting portions 24 and 34 for respectively connecting the first and second antenna conductors 21 and 31 to the ground plane 12 are formed at the connecting portion 50.

The connecting portion 50 allows the first and second antennas 20 and 30 to be less influenced by a surface current of the circuit board 11 by balancing the first and second antennas 20 and 30. For instance, the first and second antennas 20 and 30 are formed to be symmetrical or substantially symmetrical to each other.

A shielding wall 40 for reducing a coupling between the first and second antenna conductors 21 and 31 is disposed between the ground plane 12 and the first and second antenna conductors 21 and 31. The shielding wall 40 shields an electromagnetic interference between the circuit board 11 and the first and second antenna conductors 21 and 31 thereby decreasing a mutual coupling between the first and second antennas 20 and 30 and enhancing an isolation characteristic of the antenna assembly 10.

FIG. 2 is a perspective view showing an antenna conductor of an antenna assembly according to a second embodiment of the present invention.

Referring to FIG. 2, first and second antenna conductors 121 and 131 have a predetermined pattern, respectively.

That is, the first and second antenna conductors 121 and 131 include first pattern portions 125 and 135 each having a first height from a ground plane 112, and second pattern portions 126 and 136 each having a second height higher than the first height.

The first pattern portion 125 of the first antenna conductor 121 may have a '⊏' shape or other shapes. The first pattern portion 135 of the second antenna conductor 131 is formed to be symmetrical with the first pattern portion 125 of the first antenna conductor 121.

The first pattern portions 125 and 135, and the second pattern portions 126 and 136 have shapes corresponding to each other, respectively, and have folded portions at opposite positions to the feeding portions. In the preferred embodiment, the first and second pattern portions 135 and 136 of the second antenna conductor 131 are extending from each other in parallel or in substantially parallel. Similarly, the first and second pattern portions 125 and 126 of the first antenna conductor 121 are extending from each other in parallel or substantially parallel, respectively.

Accordingly, the first and second antenna conductors 121 and 131 can respectively have a decreased volume with a sufficient resonance length, thereby being easily mounted in the portable terminal.

FIG. 3 is a perspective view showing an antenna assembly having the antenna conductor of FIG. 2 therein.

Referring to FIG. 3, a shielding wall 140 is configured as a conductor plate raised, preferably vertically, from a ground plane 112 of a circuit board 111. The shielding wall 140 serves to enhance an isolation characteristic between the first and second antenna conductors 121 and 131. Preferably, the shielding wall 140 is disposed between the circuit board 111 and the first and second antenna conductors 121 and 131 so as to shield a current applied to the circuit board 111. The shielding wall 140 shields a coupling between a surface current of the circuit board 111 and the first and second antenna conductors 121 and 131, thereby reducing an interference therebetween. The shielding wall 140 may have various shapes. For example, FIG. 3 shows the shielding wall 140 having a rectangular shape.

Feeding portions 122 and 132 are connected to specific positions of the first pattern portions 125 and 135 of the first and second antenna conductors 121 and 131. The positions of the feeding portions 122 and 132 determine resonance frequencies of the first and second antennas 120 and 130. The reason is because the positions of the feeding portions 122 and 132 determine electric lengths of the first and second antennas 120 and 130. The feeding portions 122 and 132 serve as passages through which radio frequency (RF) signals are inputted to the first and second antenna conductors 121 and 131. The feeding portions 122 and 132 are disposed so as not to be connected to the shielding wall 140.

Ground connecting portions 124 and 134 are connected to the shielding wall 140 and are connected at two arbitrary positions of a connecting portion 150. The positions of the ground connecting portions 124 and 134 can control an isolation characteristic of the antenna assembly. Referring to FIG. 3, the ground connecting portions 124 and 134 are vertically extending from the connecting portion 150 and then extend in parallel or substantially parallel with the ground plane 112 so as to be connected to the shielding wall 140.

The ground connecting portions 124 and 134 serve as inductors between the shielding wall 140 and the antenna conductors 121 and 131. A capacitance element is disposed between the two ground connecting portions 124 and 134. Therefore, the ground connecting portions 124 and 134, and the shielding wall 140 are operated in the same way as an LC high pass filter. The position change of the ground connecting portions 124 and 134 determines an operation frequency of the LC high pass filter. Each optimum position of the feeding portions 122 and 132 and the ground connecting portions 124 and 134 may determine a function and an isolation characteristic of the antenna assembly at a desired frequency bandwidth.

FIG. 4 is a side view showing the antenna assembly of FIG. 3, which shows each position and each configuration of the first and second antenna conductors 121 and 131, the ground connecting portions 124 and 134, the ground plane 112, and the shielding wall 140.

Figure 5:
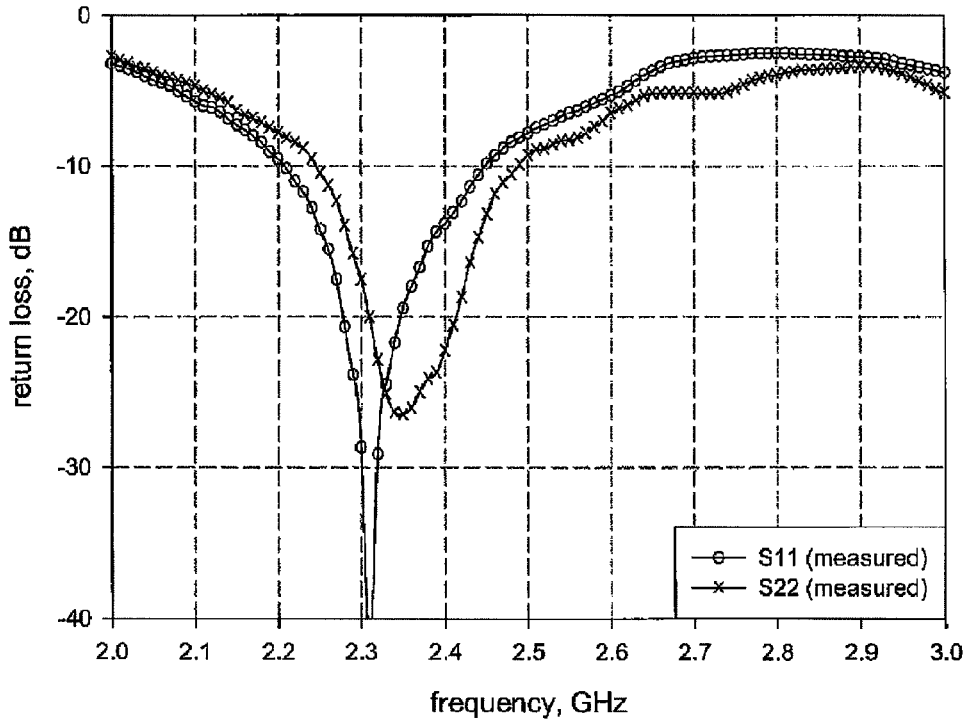
FIG. 5 is a graph showing an example of an 'S' parameter characteristic according to a return loss of the antenna assembly of the present invention.

FIG. 5 is a graph showing an 'S' parameter characteristic according to a return loss of the antenna assembly of the present invention.

The 'S' (scattering) parameter indicates a ratio between an output voltage and an input voltage with respect to frequency. For instance, 'S21' indicates a ratio of a voltage outputted to a port No. 2 with respect to a voltage inputted from a port No. 1. That is, 'S21' represents an amount of an output voltage to a port No. 2 versus an input voltage from a port No. 1.

Referring to FIG. 5, 'S11' indicates an output voltage versus an input voltage with respect to the first antenna 120. The 'S11' means a return loss of the first antenna 120 which represent a reflected degree of a signal that has not been emitted to the air. A frequency measured under the return loss of −10 dB is in a range of 2.25~2.48 GHz, which means that the antenna can be operated at a WiBro band of 2.3~2.39 GHz.

'S22' indicates a loss rate of the second antenna 130. A frequency measured under the return loss of −10 dB is in a range of 2.22~2.45 GHz, which means that the antenna can be operated at a WiBro band. Resonance frequencies of the first and second antennas 120 and 130 can be set differently according to a desired bandwidth, and can become different according to lengths and patterns of the first and second antenna conductors 121 and 131, positions of the feeding portions 122 and 132, etc.

The above features of the invention allow first and second antennas 120 and 130 to be smoothly operated at a specific frequency bandwidth.

Figure 6:
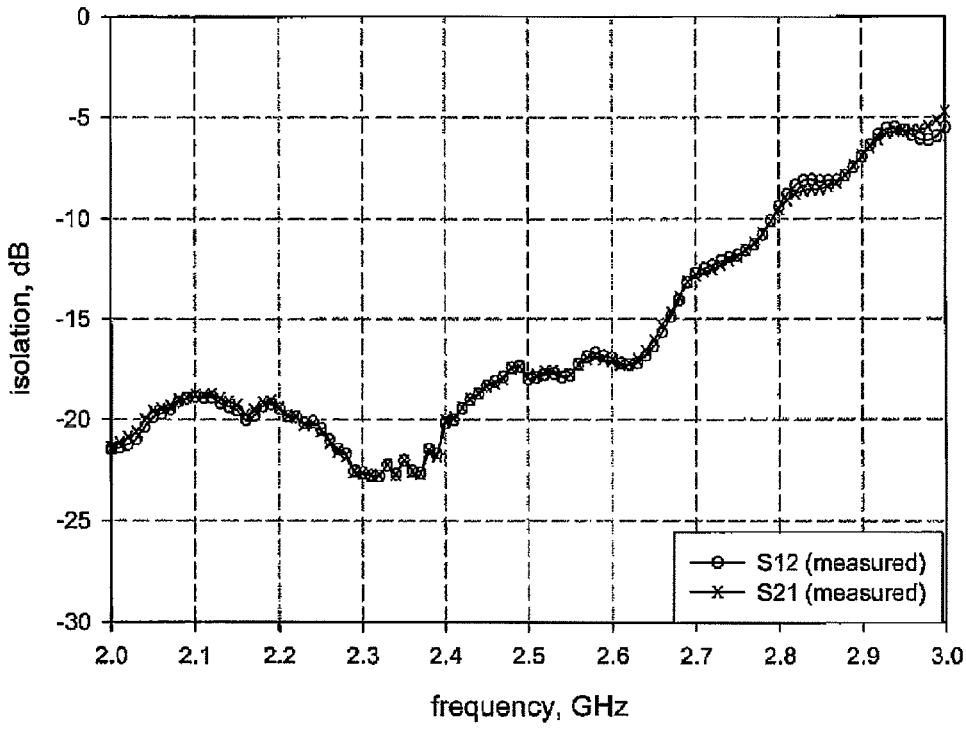
FIG. 6 is a graph showing an example of an isolation characteristic of the antenna assembly according to the present invention.

FIG. 6 is a graph showing an isolation characteristic of the antenna assembly according to the present invention.

Referring to FIG. 6, 'S12' indicates a ratio of a voltage outputted to the feeding portion 132 of the second antenna 130 with respect to a voltage inputted from the feeding portion 122 of the first antenna 120. 'S21' indicates a ratio of a voltage outputted to the feeding portion 122 of the first antenna 120 with respect to a voltage inputted from the feeding portion 132 of the second antenna 130.

The 'S12' and 'S21' maintain isolation values less than −10 dB at a WiBro band (2.3~2.39 GHz).

Figure 7:
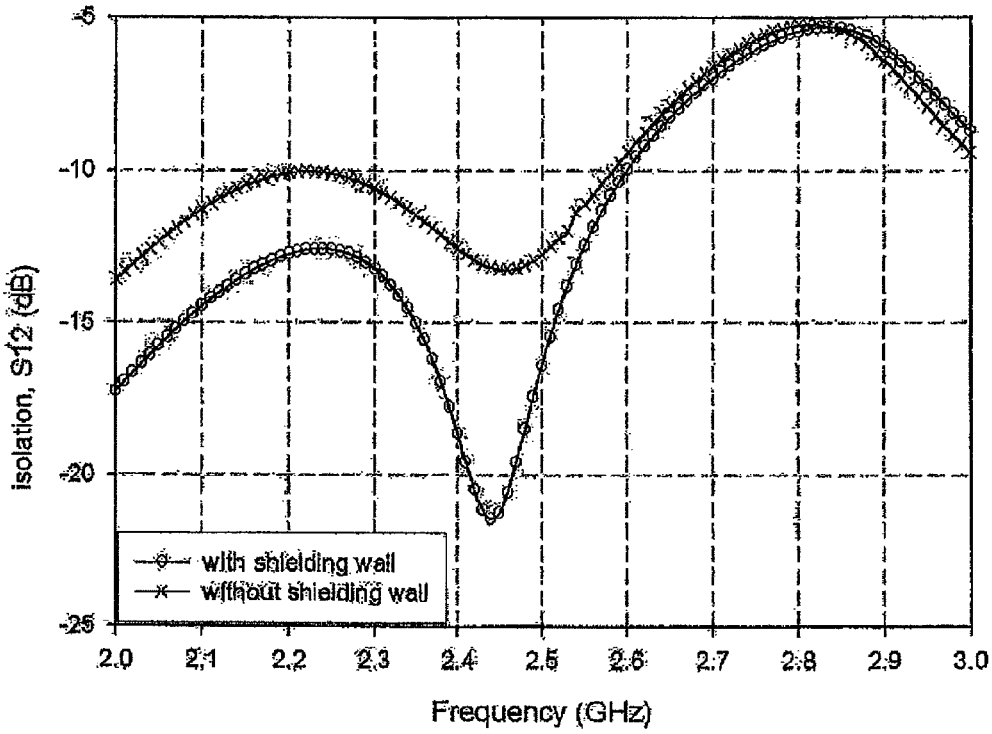
FIG. 7 is a graph showing an example of an isolation characteristic of the antenna assembly according to whether a shielding wall exists or not.

FIG. 7 is a graph showing an isolation characteristic of the antenna assembly of the present invention according to whether a shielding wall exists or not.

FIG. 7 shows different voltages at a WiBro bandwidth according to whether the shielding wall 140 exists or not. Referring to FIG. 7, the 'S12' when the shielding wall 140 exists is much smaller than the 'S12' when the shielding wall 140 does not exist. This means that the first and second antennas 120 and 130 have an enhanced isolation characteristic with respect to each other.

Figure 8:
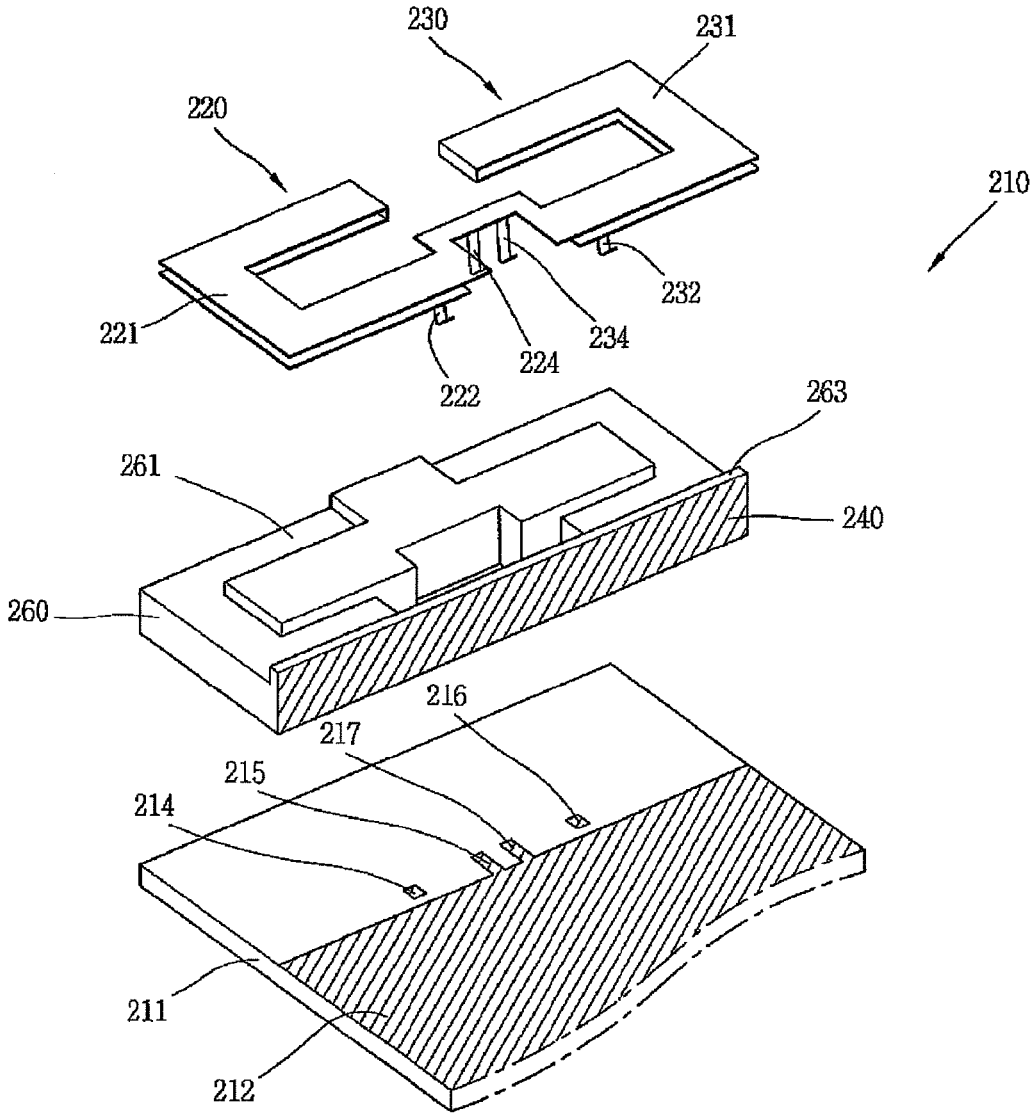
FIG. 8 is an exploded perspective view showing an antenna assembly according to a third embodiment of the present invention.

FIG. 8 is an exploded perspective view showing an antenna assembly according to a third embodiment of the present invention.

Referring to FIG. 8, an antenna assembly 210 comprises the first and second antennas 220 and 230 each having a predetermined pattern, a circuit board 211 having a ground plane 212, and a carrier 260 for supporting the first and second antennas 220 and 230 to the circuit board 211.

The carrier 260 is formed of a dielectric substance, and has a mounting unit 261 for supporting the first and second antennas 220 and 230. Feeding portions 222 and 232 of the first and second antennas 220 and 230, and ground connecting portions 224 and 234 of the first and second antennas 220 and 230 are formed to have elastic finger types contacting pads 214, 216, 215 and 217 formed on the circuit board 211, respectively.

The first and second antennas 220 and 230 are electrically connected to each other, thereby being less influenced by a surface current of the circuit board 211 and being less influenced by a user's body such as hands or a head.

In the present invention, a carrier wall 263 is formed at a contact surface of the carder 260 to the ground plane 212. A shielding layer 240 having a conductivity is formed at the carrier wall 263. The shielding layer may be implemented using a conductive material or as a metallic material or other conductive material coated on the carrier wall 263. The shielding layer 240 directly contacts the ground plane 212, thereby enhancing an isolation characteristic of the first and second antennas 220 and 230.

Figure 9:
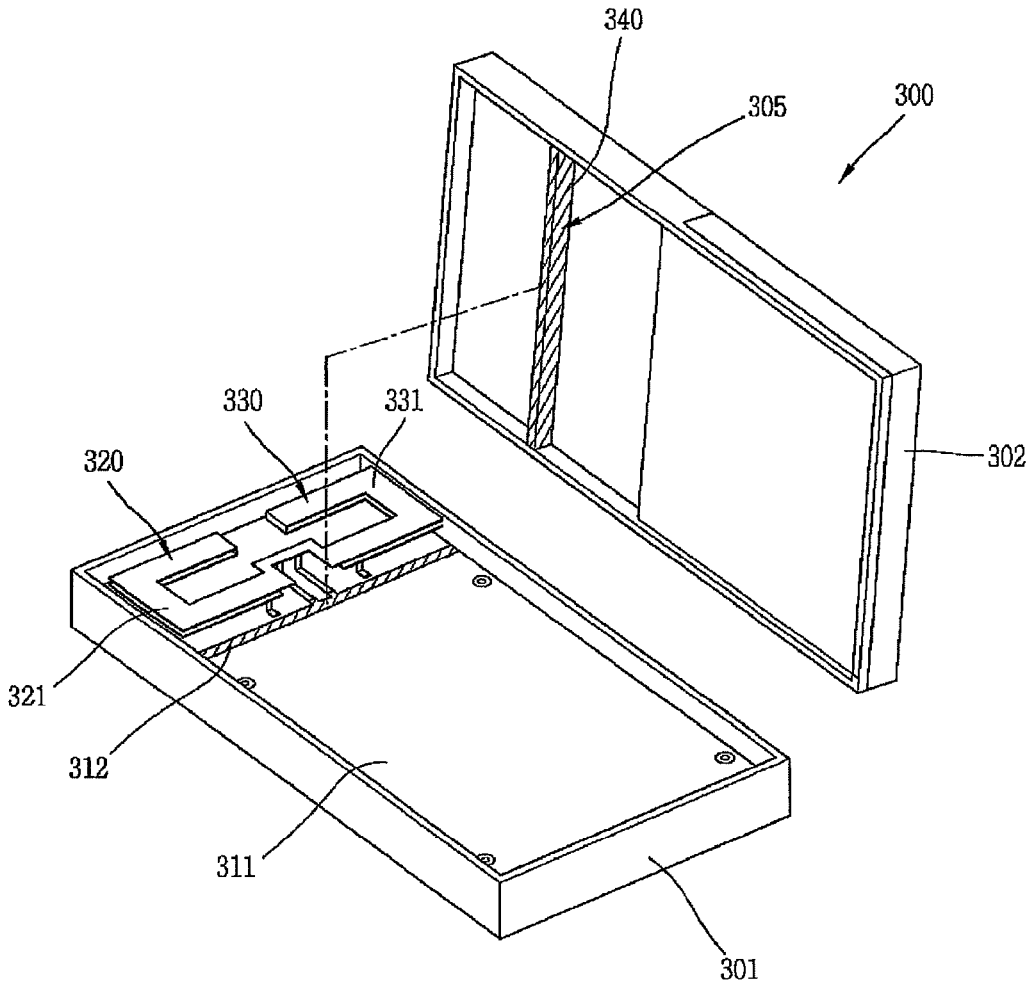
FIG. 9 is an exploded perspective view showing a portable terminal having an antenna assembly according to a fourth embodiment of the present invention.

FIG. 9 is an exploded perspective view showing a portable terminal having an antenna assembly according to a fourth embodiment of the present invention.

Referring to FIG. 9, a portable terminal 300 comprises the first and second cases 301 and 302 that form an appearance thereof. An antenna assembly for implementing a mobile communication service is provided at the first and second antennas 301 and 302. Since the antenna assembly is mounted in the portable terminal 300, the portable terminal 300 has an enhanced appearance.

The first and second antennas 320 and 330 of the antenna assembly are disposed at one side of a circuit board 311 in parallel or substantially parallel to the circuit board 311, and are connected to the circuit board 311 by the aforementioned feeding method.

The first and second antennas 320 and 330 are electrically connected to each other, thereby being less influenced by a surface current of the circuit board 311 due to a reciprocal balance therebetween and being less influenced by a user's body such as hands or a head.

In the present invention, a shielding layer 340 is formed at a rib 305 disposed at a second case 302, thereby reducing a coupling between the first and second antennas 320 and 330. The rib 305 is formed so that the first and second antennas 320 and 330 can substantially form an angle of 90° from a ground plane 312. The rib 305 directly contacts the ground plane 312.

The shielding layer 340 may be implemented as a conductive material such as an EMI material is coated on the rib 305 of the second case 302.

In the present invention, the antenna assembly 310 can be isolated from RF components of the circuit board 311, and can enhance an isolation characteristic between the first and second antennas 320 and 330. Furthermore, the shielding layer 340 may be implemented as a metallic shielding can for shielding the RF components.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An antenna assembly, comprising:

a circuit board having a ground plane at a predetermined region;

first and second antenna conductors spaced from each other at one side of the ground plane; and a shielding wall disposed between the ground plane and the first and second antenna conductors, for reducing a coupling between the first and second antenna conductors, wherein the shielding wall is formed of a sheet having a conductivity or is coated with a conductive material,

*wherein each of the first and second antenna conductors respectively comprises a first pattern portion having a first height from the ground plane and a second pattern portion having a second height higher than the first height, and*

*wherein the first and second pattern portions are connected to each other*.

2. The antenna assembly of claim 1, wherein the shielding wall substantially forms an angle of 90° from the ground plane.

[3. The antenna assembly of claim 1, wherein each of the first and second antenna conductors respectively comprises:

a first pattern portion having a first height from the ground plane; and a second pattern portion having a second height higher than the first height wherein the first and second pattern portions are connected to each other.]

4. The antenna assembly of claim [3] *1*, wherein the second pattern portion of the first antenna conductor and the second pattern portion of the second antenna conductor are electrically connected to each other.

5. The antenna assembly of claim 4, wherein each of the first and second antenna conductors comprises a feeding portion for feeding signals to the circuit board, *and* wherein the feeding portion is connected to the first pattern portion.

6. The antenna assembly of claim [3]*1*, wherein the first and second antenna conductors are formed to be substantially symmetrical to each other.

7. The antenna assembly of claim [6] *5*, wherein each of the first and second antenna conductors further comprise a ground connecting portion for connecting the first and second antenna conductors to the ground plane, *and* wherein the ground connecting portion is disposed at a connection part between the second pattern portion of the first antenna conductor and the second pattern portion of the second antenna conductor.

8. The antenna assembly of claim 7, wherein a capacitance element is further disposed between the ground connecting portion of the first antenna conductor and the ground connecting portion of the second antenna conductor, and an inductance element is further disposed between the shielding wall and the first and second antenna conductors and the shielding wall.

9. A portable terminal, comprising:

a case; and an antenna assembly mounted in the case and implementing a mobile communication service, and wherein the antenna assembly comprises:

a circuit board having a ground plane at a predetermined region;

first and second antenna conductors spaced from each other at one side of the ground plane; and a shielding wall disposed between the ground plane and the first and second antenna conductors, for reducing a coupling between the first and second antenna conductors, wherein the shielding wall is formed of a sheet having a conductivity or is coated with a conductive material, *and*

*wherein the shielding wall is formed as an EMI* (*electromagnetic interference*) *material deposited on a rib protruding from an inner surface of the case*.

10. The portable terminal of claim 9, wherein the shielding wall substantially forms an angle of 90° from the ground plane.

[11. The portable terminal of claim 9, wherein the shielding wall is formed as an EMI (electromagnetic interference) material deposited on a rib protruding from an inner surface of the case.]

12. The portable terminal of claim 9, wherein the shielding wall is formed as a dielectric carrier for supporting the first and second antenna conductors.

13. The portable terminal of claim 9, wherein the shielding wall is formed as a shielding can for shielding RF components of the circuit board.

14. The portable terminal of claim 9, wherein each of the first and second antenna conductors respectively comprises:

a first pattern portion having a first height from the ground plane; and a second pattern portion having a second height higher than the first height, and wherein the first and second pattern portions are connected to each other.

15. The portable terminal of claim 14, wherein the second pattern portion of the first antenna conductor and the second pattern portion of the second antenna conductor are electrically connected to each other.

16. The portable terminal of claim 14, wherein the first and second antenna conductors are formed to be substantially symmetrical to each other.

17. The portable terminal of claim 16, wherein each of the first and second antenna conductors comprise a feeding portion for feeding signals to the circuit board, *and* wherein the feeding portion is connected to the first pattern portion.

18. The portable terminal of claim 16, wherein each of the first and second antenna conductors further comprise a ground connecting portion for connecting the first and second antenna conductors to the ground plane, *and* wherein the ground connecting portion is disposed at a connection part between the second pattern portion of the first antenna conductor and the second pattern portion of the second antenna conductor.

19. The portable terminal of claim 18, wherein a capacitance element is further disposed between the ground connecting portion of the first antenna conductor and the ground connecting portion of the second antenna conductor, and an inductance element is further disposed between the shielding wall and the first and second antenna conductors.

[20. An antenna assembly, comprising:

a circuit board having a ground plane at a predetermined region;

first and second antenna conductors spaced from each other at one side of the ground plane; and a shielding wall disposed between the ground plane and the first antenna conductor and between the ground plane and the second antenna conductor, for reducing a coupling between the first and second antenna conductors.]

[21. A portable terminal, comprising:

a case; and an antenna assembly mounted in the case and implementing a mobile communication service, wherein the antenna assembly comprises:

a circuit board having a ground plane at a predetermined region;

first and second antenna conductors spaced from each other at one side of the ground plane; and a shielding wall disposed between the ground plane and the first antenna conductor and between the ground plane and the second antenna conductor, for reducing a coupling between the first and second antenna conductors.]

*22. An antenna assembly, comprising:*

*a printed circuit board;*

*at least one antenna radiation unit disposed next to the printed circuit board; and*

*a shielding surface disposed between the printed circuit board and the at least one antenna radiation unit so as to reduce an interference between the printed circuit board and the at least one antenna radiation unit,*

*wherein at least a portion of the shielding surface comprises a conductive material,*

*wherein the shielding surface is formed to be substantially perpendicular to the printed circuit board, and*

*wherein the printed circuit board is installed in a first outer casing among two outer casing enclosing the printed circuit board and the at least one antenna radiation unit.*

*23. The antenna assembly of claim 22, wherein the printed circuit board has a rectangular shape and one side of the printed circuit board where the at least one antenna radiation unit is disposed is a shorter side of the rectangular shape.*

*24. The antenna assembly of claim 22, wherein the shielding surface is a barrier rib.*

*25. The antenna assembly of claim 24, wherein the barrier rib includes an EMI (Electromagnetic interference) material.*

*26. The antenna assembly of claim 22, wherein the at least one antenna radiation unit includes first and second antenna conductors.*

*27. The antenna assembly of claim 26, wherein the first and second conductors are separated from each other until connecting together at a connection point.*

*28. A mobile terminal, comprising:*

*a wireless communication unit configured to wirelessly communicate with at least one other terminal;*

*a display configured to display information;*

*a printed circuit board;*

*at least one antenna radiation unit disposed next to the printed circuit board; and*

*a shielding surface disposed between the printed circuit board and the at least one antenna radiation unit so as to reduce an interference between the printed circuit board and the at least one antenna radiation unit,*

*wherein at least a portion of the shielding surface comprises a conductive material,*

*wherein the shielding surface is formed to be substantially perpendicular to the printed circuit board,*

*wherein the at least one antenna radiation unit includes first and second antenna conductors, and*

*wherein the first and second antenna conductors are separated from each other until connecting together at a connection point.*

*29. The mobile terminal of claim 28, wherein the printed circuit board has a rectangular shape and one side of the printed circuit board where the at least one antenna radiation unit is disposed is a shorter side of the rectangular shape.*

*30. The mobile terminal of claim 28, wherein the shielding surface is a barrier rib.*

*31. The mobile terminal of claim 30, wherein the barrier rib includes an EMI (Electromagnetic interference) material.*

*32. A mobile terminal, comprising:*

*a circuit board;*

*a ground plane;*

*a first conductive antenna and a second conductive antenna; and*

*a conductive wall disposed between the ground plane and the first antenna and between the ground plane and the second antenna,*

*wherein the conductive wall directly contacts the ground plane and is perpendicular to the first and the second antennas.*

*33. The mobile terminal of claim 32, wherein the circuit board has a rectangular shape and one side of the circuit board where the first and second conductive antennas are disposed is a shorter side of the rectangular shape.*

*34. The mobile terminal of claim 32, wherein the conductive wall includes an EMI (Electromagnetic interference) material.*

*35. The mobile terminal of claim 32, wherein the circuit board is installed in a first outer casing among two outer casings enclosing the circuit board and the first and second conductive antennas.*

*36. The mobile terminal of claim 32, wherein the first and second conductive antennas are separated from each other until connecting together at a connection point.*

*37. A mobile terminal, comprising:*

*a ground plane;*

*first and second antenna conductors disposed next to the ground plane;*

*a connecting portion configured to electrically connect the first and second antenna conductors to each other; and*

*a conductive wall disposed between the ground plane and the first antenna conductor and between the ground plane and the second antenna conductor,*

*wherein the conductive wall is formed to be substantially perpendicular to the ground plane.*

*38. The mobile terminal of claim 37, wherein the conductive wall directly contacts the ground plane.*

*39. The mobile terminal of claim 37, wherein the ground plane is disposed next to the conductive wall and spaced apart from the first and second antenna conductors with interposing the conductive wall therebetween.*

*40. The mobile terminal of claim 37, wherein the ground plane is disposed between the first and second antenna conductors.*

*41. The mobile terminal of claim 37, further comprising a printed circuit board having the ground plane at a predetermined region.*

*42. The mobile terminal of claim 37, wherein the conductive wall extends along the widthwise direction of the mobile terminal.*

*43. The mobile terminal of claim 37, wherein each of the first and second antenna conductors has a folded portion.*

*44. A mobile terminal, comprising:*

*a wireless communication unit configured to wirelessly communicate with at least one other terminal;*

*a display configured to display information;*

*a printed circuit board;*

*at least one antenna radiation unit disposed next to the printed circuit board; and*

*a shielding surface disposed between the printed circuit board and the at least one antenna radiation unit so as to reduce an interference between the printed circuit board and the at least one antenna radiation unit,*

*wherein at least a portion of the shielding surface comprises a conductive material,*

*wherein the shielding surface is formed to be substantially perpendicular to the printed circuit board, and*

*wherein the printed circuit board is installed in a first outer casing among two outer casings enclosing the printed circuit board and the at least one antenna radiation unit.*

*45. A mobile terminal, comprising:*

*a ground plane;*

*first and second antenna conductors disposed next to the ground plane;*

*a conductive wall disposed between the ground plane and the first antenna conductor and between the ground plane and the second antenna conductor; and*

*first and second housings enclosing the ground plane,*

*wherein the conductive wall is formed to be substantially perpendicular to the ground plane and is configured to protrude from the first or second housing.*

*46. A mobile terminal, comprising:*

*a ground plane;*

*first and second antenna conductors disposed next to the ground plane; and*

*a conductive wall disposed between the ground plane and the first antenna conductor and between the ground plane and the second antenna conductor; and*

*first and second housings enclosing the ground plane,*

*wherein the conductive wall is formed to be substantially perpendicular to the ground plane, and*

*wherein at least one of the first and second antenna conductors has a folded portion formed along an edge of the first or second housing.*

* * * * *